US009195232B1

(12) United States Patent
Egnor et al.

(10) Patent No.: US 9,195,232 B1
(45) Date of Patent: Nov. 24, 2015

(54) METHODS AND SYSTEMS FOR COMPENSATING FOR COMMON FAILURES IN FAIL OPERATIONAL SYSTEMS

(71) Applicant: Google Inc., Mountain View, CA (US)

(72) Inventors: Daniel Trawick Egnor, Mountain View, CA (US); Alexander Zbrozek, Mountain View, CA (US); Andrew Schultz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 25 days.

(21) Appl. No.: 14/172,906

(22) Filed: Feb. 5, 2014

(51) Int. Cl.
*G01C 22/00* (2006.01)
*G05D 1/00* (2006.01)

(52) U.S. Cl.
CPC .................................... *G05D 1/0055* (2013.01)

(58) Field of Classification Search
CPC . G06K 15/408; G09G 2330/08; G09G 5/393; G09G 5/395; G11C 2029/0411; G11C 7/1006; H02H 1/0015; H02H 3/16
USPC ...................................................... 701/23, 28
See application file for complete search history.

(56) References Cited

U.S. PATENT DOCUMENTS

| 5,548,516 | A | 8/1996 | Gudat |
| 5,646,845 | A | 7/1997 | Gudat |
| 6,164,406 | A | 12/2000 | Diekhans |
| 6,357,427 | B1 * | 3/2002 | Luttrelll et al. ............... 123/609 |
| 8,060,278 | B2 | 11/2011 | Bolio |
| 2005/0115753 | A1 | 6/2005 | Pemberton |
| 2006/0031001 | A1 * | 2/2006 | Snowbarger et al. ......... 701/114 |
| 2010/0109423 | A1 * | 5/2010 | Baldassara ..................... 301/6.2 |
| 2012/0117416 | A1 * | 5/2012 | McLaughlin ................ 714/4.11 |
| 2012/0153070 | A1 * | 6/2012 | Janiak et al. .................. 244/3.1 |

* cited by examiner

*Primary Examiner* — Muhammad Shafi
(74) *Attorney, Agent, or Firm* — McDonnell Boehnen Hulbert & Berghoff LLP

(57) ABSTRACT

Methods and systems for compensating for common failures in fail operational systems are described herein. An example system may include a primary controller configured to perform functions of a vehicle such as propulsion, braking and steering and a secondary controller configured in a redundant configuration with the primary controller. The controllers may perform cross-checks of each other and may each perform internal self-checks as well. Additionally, the system may include a control module configured to transfer control of the vehicle between the controllers based on detecting a fault. The control module may detect a common fault of the controllers that causes the control module to output a common fault signal. In response, the system may transfer of control to a safety controller configured to perform the vehicle functions until the system may transfer control back to the primary controller.

18 Claims, 7 Drawing Sheets

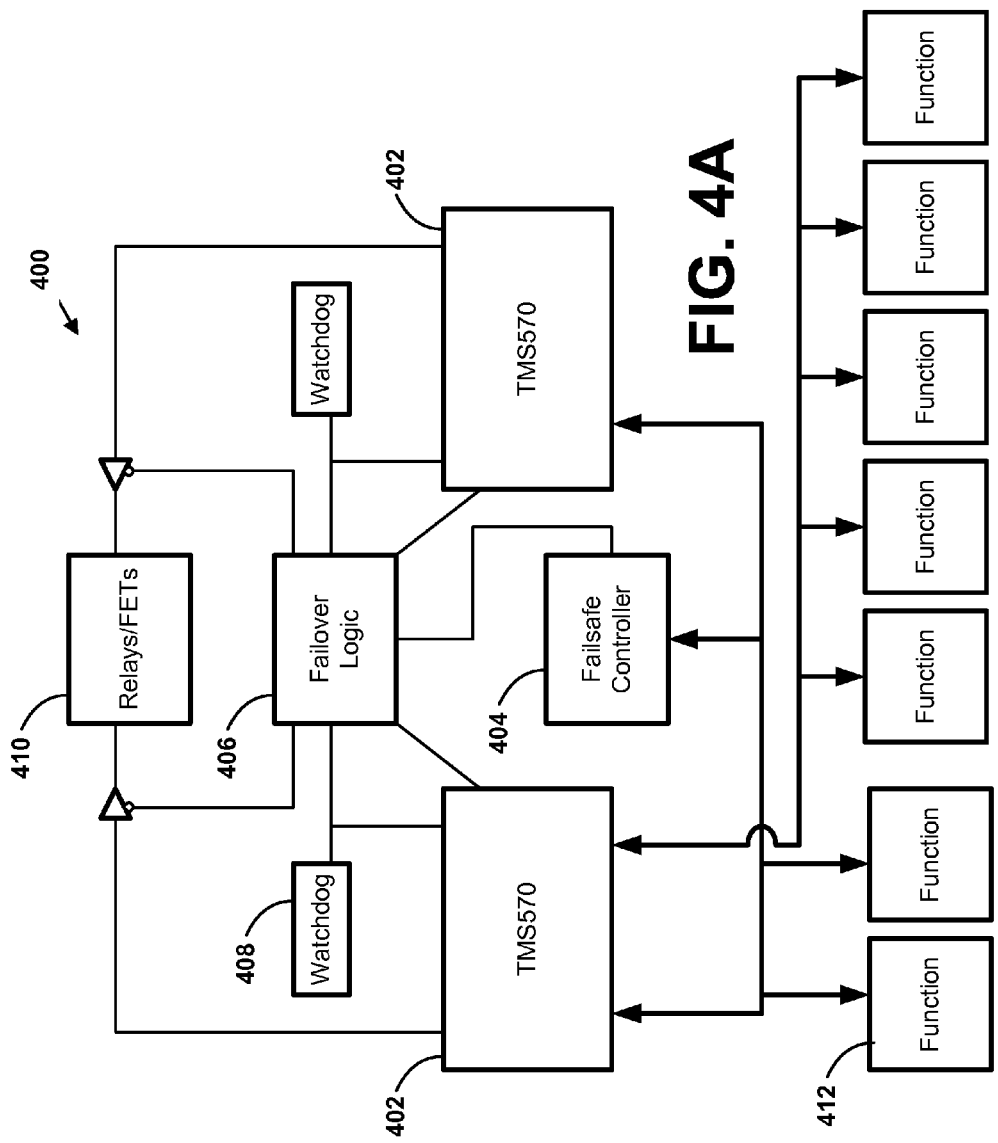

METHODS AND SYSTEMS FOR COMPENSATING FOR COMMON FAILURES IN FAIL OPERATIONAL SYSTEMS

BACKGROUND

Unless otherwise indicated herein, the materials described in this section are not prior art to the claims in this application and are not admitted to be prior art by inclusion in this section.

A mechanical system may include multiple components configured a variety of functions. For example, a vehicle may include different components, such as brakes, an engine, and a steering system, all configured to enable a driver navigate the vehicle safely. A system may be configured to assist in operations or functions of a device. In order to execute the operations or functions, the system may include controllers configured to execute logic that preforms functions. A controller may exist in a system as a chip, an expansion card, or a stand-alone device that may interface with a peripheral device.

SUMMARY

The present application discloses embodiments that relate to methods and systems for compensating for common failures in fail operational systems.

In one example, the present application describes a method. The method may comprise providing instructions, by a primary controller, to perform functions associated with control of operation of a vehicle including vehicle propulsion, braking and steering. The method may further comprise providing a secondary controller configured in a redundant configuration as the primary controller, and the primary controller and the secondary controller are configured to perform cross-checks of each other. The method may also comprise transferring control of operation of the vehicle between the primary controller and the secondary controller based on a detected fault at one of the primary controller and the secondary controller. The method may also comprise outputting a common fault signal based on detection of a common fault of the primary controller and the secondary controller. The method may further comprise based on the common fault signal, transferring control of operation of the vehicle to a safety controller that is configured to perform functions associated with control of operation of the vehicle including vehicle braking.

In another example, the present application describes a non-transitory computer readable medium having stored thereon executable instructions that, upon execution by a computing device, cause the computing device to perform functions. The functions may comprise receiving outputs of a primary controller and a secondary controller, and the primary controller is configured to perform functions associated with control of operation of a vehicle including vehicle propulsion, braking and steering, and the secondary controller is configured in a redundant configuration as the primary controller, and the primary controller and the secondary controller are configured to perform cross-checks of each other. The functions may also comprise transferring control of operation of the vehicle between the primary controller and the secondary controller based on receiving a given output indicative of a detected fault at one of the primary controller and the secondary controller. The functions may include transferring control of operation of the vehicle to a safety controller based on detection of a common fault of the primary controller and the secondary controller, and the safety controller is configured to perform functions associated with control of operation of the vehicle including vehicle braking.

In still another example, the present application describes a system. The system may comprise a primary controller configured to perform functions associated with control of operation of a vehicle including vehicle propulsion, braking and steering. The system may also comprise a secondary controller configured in a redundant configuration as the primary controller, and the primary controller and the secondary controller are configured to perform cross-checks of each other. The system may further comprise a control module configured to transfer control of operation of the vehicle between the primary controller and the secondary controller based on the detected fault at one of the primary controller and the secondary controller, and the control module may be further configured to detect a common fault of the primary controller and the secondary controller. Additionally, the control module may be configured to responsively output a common fault signal. The system may comprise a safety controller coupled to the control module, and based on receiving the common fault signal the safety controller is configured to receive transfer of control of operation of the vehicle and to perform functions associated with control of operation of the vehicle including vehicle braking.

In a further example, a system is provided that comprises a means for providing instructions, by a primary controller, to perform functions associated with control of operation of a vehicle including vehicle propulsion, braking and steering. The system may further comprise means for providing a secondary controller configured in a redundant configuration as the primary controller, and the primary controller and the secondary controller are configured to perform cross-checks of each other. The system may also comprise means for transferring control of operation of the vehicle between the primary controller and the secondary controller based on a detected fault at one of the primary controller and the secondary controller. The system may also comprise means for outputting a common fault signal based on detection of a common fault of the primary controller and the secondary controller. The system may comprise means for, based on the common fault signal, transferring control of operation of the vehicle to a safety controller that is configured to perform functions associated with control of operation of the vehicle including vehicle braking.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4A illustrates an example system for compensating for common failures in a fail operational system.

DETAILED DESCRIPTION

Figure 1:
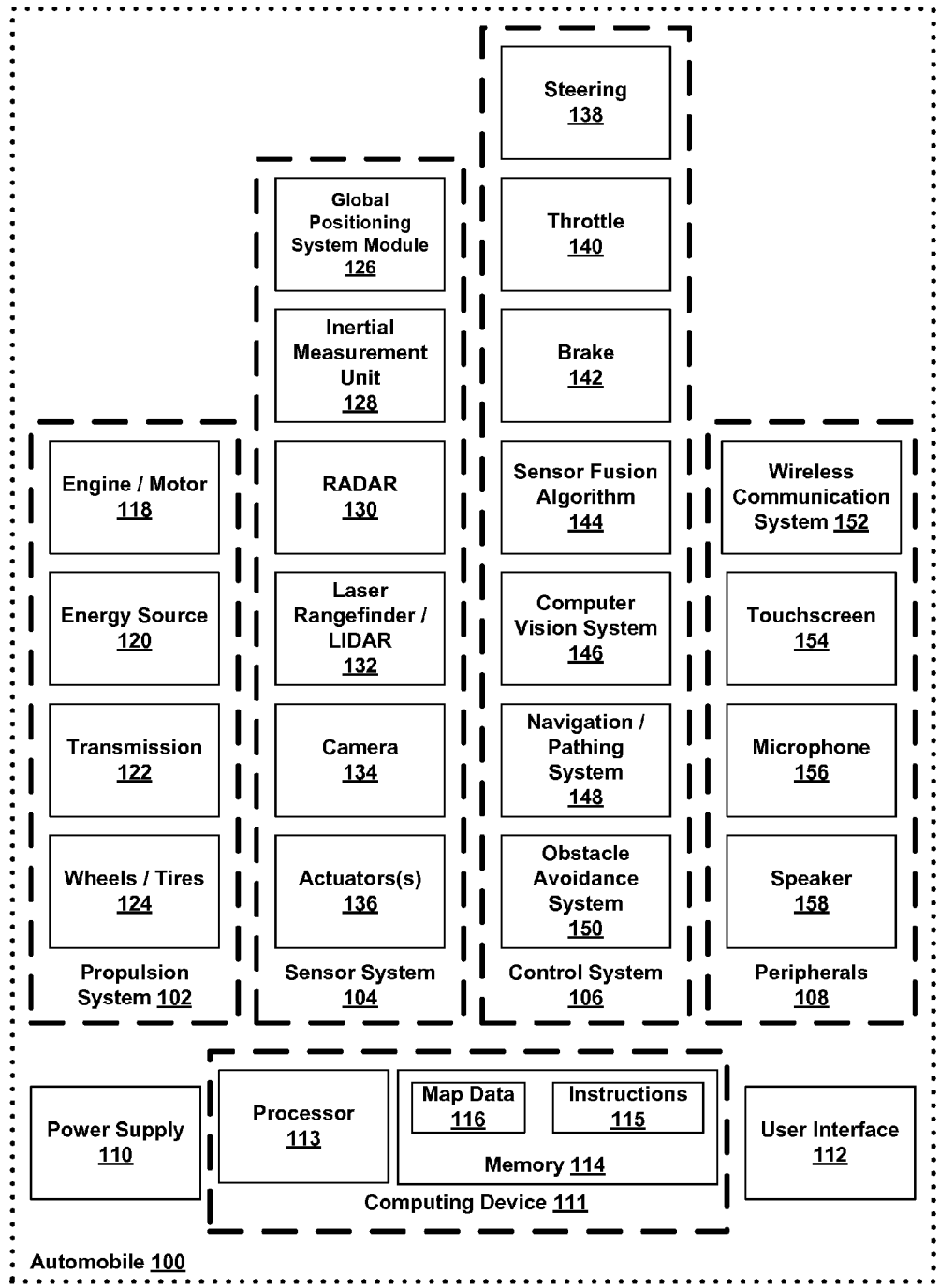
FIG. 1 is a simplified block diagram of an example vehicle, in accordance with an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

A vehicle or other entity may include a system or components configured to control functions of the vehicle. The system may include electrical and/or mechanical components arranged to assist in operations of the vehicle. Within the system, microprocessors or processors, also described herein as controllers, may operate based on logic (e.g., software) in order to execute functions of the vehicle. In an example implementation, a system of a vehicle or another mechanical entity may include a microprocessor operating as a primary controller configured to perform vehicle functions. For example, a variety of functions may be executed by the primary controller, such as functions pertaining to the control of operations of the vehicle including vehicle propulsion, braking and steering. In order to execute the functions, a primary controller or other microprocessors of a vehicle may execute sets of logic to control the functions, which may vary within other examples. A vehicle system may allocate microprocessors to execute different sets of logic depending on the functions desired from the microprocessors, for example.

In addition, the system of the vehicle may also include additional microprocessors, such as a secondary controller configured in a redundant configuration as the primary controller. In some examples, the primary controller and the secondary controller may be configured to perform cross-checks of each other. The primary controller and secondary controller may also be configured to reset based on detecting a fault or other error at one of the primary controller and the secondary controller. For example, the controllers may be configured to reset based on detecting the primary controller and/or secondary controller outputting an error. The system may include additional controllers configured to check the operation of the primary controller or secondary controller. Additionally, the different microprocessors (e.g., controllers) may be configured to perform self-checks, which may include determining whether or not the microprocessor is functioning properly internally. The microprocessors may output an error signal or reset based on internal self-checks as well as during any executed cross-checks performed with the assistance of at least one other microprocessor.

Furthermore, some example systems may include a control module configured to transfer control of vehicle operations between microprocessors, such as between the primary controller and the secondary controller. The control module may be configured to transfer control based on detecting a fault at one of the primary and the secondary controller in order to ensure proper control of the vehicle. In some instances, the control module may detect a common fault of the primary controller and the secondary controller. The common fault, which may also be described as a simultaneous failure of the primary controller and the secondary controller, may occur due to a variety of reasons, such as common errors of the controllers executing logic, cascading errors, or other situations where simple redundancy may be insufficient, for example. In some instances, the control module may be configured to responsively output a common fault signal. The common fault may cause the primary controller and the secondary controller to require a reset, which may further involve the control module transferring control to another microprocessor within the system, such as a safety controller.

As indicated, the system of the vehicle or mechanical unit may include a safety controller, which may communicate with the control module of the system. In some instances, the system may, based on receiving the common fault (e.g., simultaneous errors in operation of controlling microprocessors), provide a signal, instructions, or some other indication to the safety controller to receive a transfer of the control of vehicle operations. The safety controller may function as a result of the failures of the microprocessors primarily in charge of vehicle operations, such as primary and secondary controller, for example.

After receiving a signal, the safety controller may perform functions associated with control of operation of the vehicle including vehicle braking. In some instances, the safety controller may be configured to perform vehicle functions using different logic than the logic used by the other controllers (e.g., primary and secondary controller) and may operate independently of other controllers of the system. This way, the safety controller may avoid errors or bugs in the logic corresponding to vehicle functions executed by the other microprocessors that may have caused failures. In addition, the safety controller may perform simplified functions, such as bringing the vehicle to a stop by applying brakes. In other cases, the safety controller may execute many functions, which may include all the functions that the primary controller and/or secondary controller had been previously executing. Within some example implementations, a system of a vehicle may include multiple microprocessors operating as safety controllers, which may be configured to obtain control of a respective function of the vehicle, for example. The additional safety controllers may exist in a redundant configuration or another configuration.

In some cases, a safety controller or another microprocessor in the system of the vehicle may determine a state of operation of the vehicle (e.g., motion, direction, position of the vehicle) and may perform functions controlling the vehicle, such as applying brakes, based on the state of operation. The safety controller may determine the amount of force to apply to the brakes based on the speed or other parameters of the vehicle as possibly determined as the state of operation of the vehicle. The safety controller or another processor may execute multiple or all the functions previously executed by the primary controller and/or secondary controller prior to the transferring of control to the safety controller due to a failure by the primary controller and/or secondary controller.

Furthermore, in some instances, a system of a vehicle may include a reset module (e.g., components configured to execute resetting functions). The reset module may reset microprocessors, such as the primary controller and the secondary controller based on detecting a common fault between the two controllers, for example. Additionally, the reset module may also be configured to transfer or cause the transfer of control from a safety controller or another microprocessor back to the primary controller and/or secondary controller after the primary controller and/or secondary controller completes resetting. The system may be configured to allow only one microprocessor to be in control of vehicle operations. For example, the system may only enable the primary controller, the secondary controller, or the safety controller, or another microprocessor to control operations of the vehicle at a given time.

Example systems within the scope of the present disclosure will now be described in greater detail. Generally, an example system may be implemented in or may take the form of an automobile. However, an example system may also be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the vehicle 100. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the vehicle 100 may include more, fewer, or different systems, and each system may include more, fewer, or different components. Additionally, the systems and components shown may be combined or divided in any number of ways.

The propulsion system 102 may be configured to provide powered motion for the vehicle 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine, etc. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the vehicle 100 (e.g., an $O_2$ monitor, a fuel gauge, an engine oil temperature, etc.). Other sensors are possible as well.

The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be traveling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the vehicle 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, the LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the vehicle 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the vehicle 100 illuminates an object in the environment with a predetermined light pattern, such as a grid or checkerboard pattern and uses the camera 134 to detect a reflection of the predetermined light pattern off the object. Based on distortions in the reflected light pattern, the vehicle 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100.

The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well.

The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions, including any of the functions or methods described herein.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems is shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
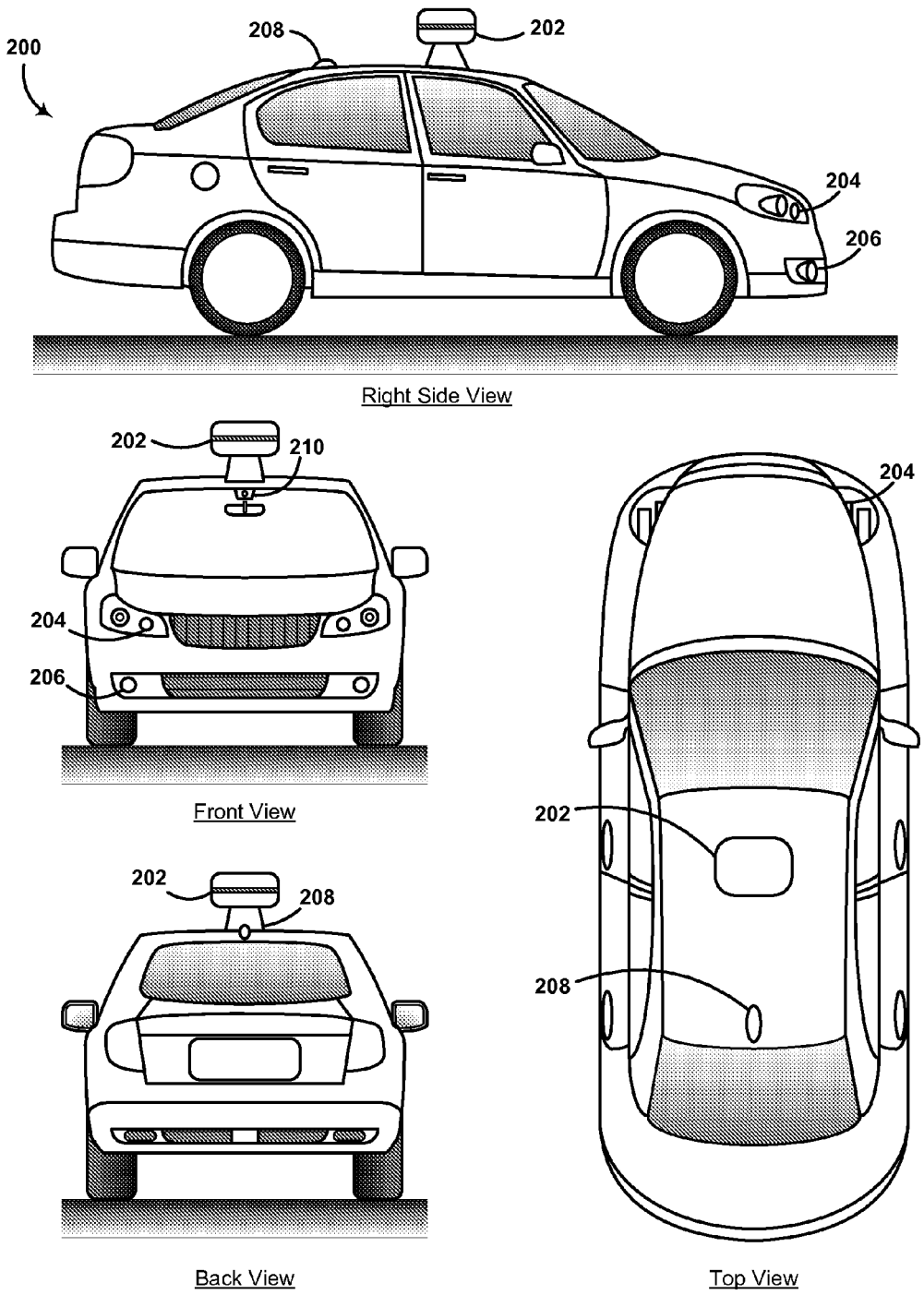
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as a car, other examples are possible. For instance, the vehicle 200 could represent a truck, a van, a semi-trailer truck, a motorcycle, a golf cart, an off-road vehicle, or a farm vehicle, among other examples. As shown, the vehicle 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may take any of the forms described above with respect to the camera 134 in FIG. 1. While the camera 210 is shown to be mounted inside a front windshield of the vehicle 200, in other examples the camera 210 may be mounted elsewhere on the vehicle 200, either inside or outside the vehicle 200.

The vehicle 200 may include one or more other components in addition to or instead of those shown.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
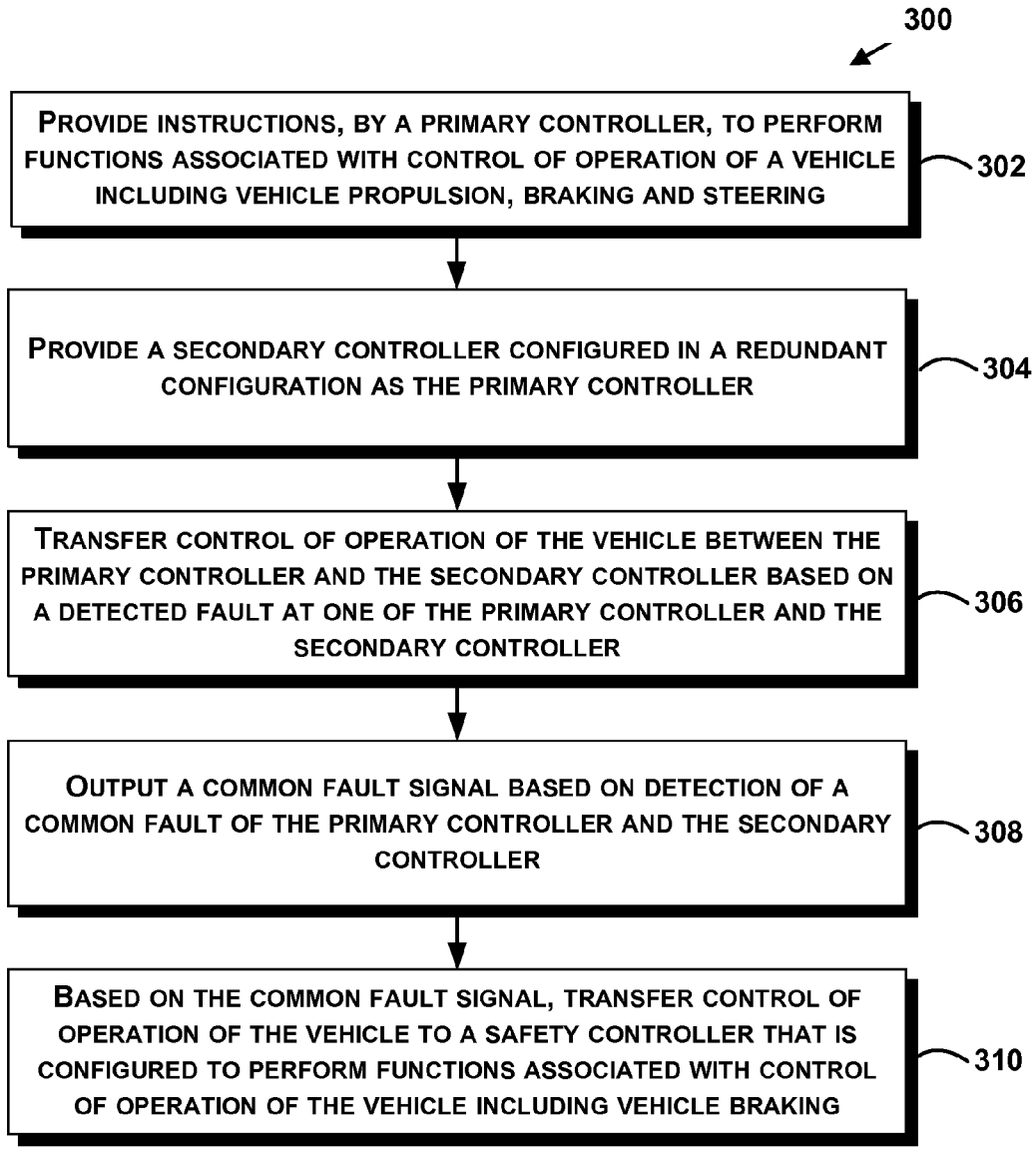
FIG. 3 is a flow chart of an example method for compensating for common failures in fail operational system.

FIG. 3 is a flow chart of an example method 300 for compensating for common failures in a fail operational system. The method 300 may include one or more operations, functions, or actions as illustrated by one or more blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

The non-transitory computer readable medium could also be distributed among multiple data storage elements, which could be remotely located from each other. A computing device or system that executes some or all of the stored instructions could be a vehicle, such as the example vehicle 200 illustrated in FIG. 2. Alternatively, the computing device or system that executes some or all of the stored instructions could be another computing device or system, such as a server.

In addition, for the method 300 and other processes and methods disclosed herein, each block in FIG. 3 may represent circuitry that is wired to perform the specific logical functions in the process.

Example methods, such as method 300 of FIG. 3 may be carried out in whole or in part by the vehicle and its subsystems. Accordingly, example methods could be described by way of example herein as being implemented by the vehicle. The vehicle may be autonomous, partially autonomous, or controlled completely by a user, for example. However, it should be understood that an example method may be implemented in whole or in part by other computing devices of the vehicle or separate from the vehicle. For example, an example method may be implemented in whole or in part by a server system, which receives data from a device such as those associated with the vehicle. Other examples of computing devices or combinations of computing devices that can implement an example method are possible.

At block 302, the method 300 may include providing instructions, by a primary controller, to perform functions associated with control of operation of a vehicle including vehicle propulsion, braking and steering.

A system of a vehicle, such as a general control module or computing system, may control various operations or functions of the vehicle. Although the system described herein involves executing operations of a vehicle, other example systems may execute functions for other types of mechanical entities, such as mechanical machines or computing devices. Example systems may include microprocessors/processors (also referred to herein as controllers) configured to execute functions. In some instances, a controller may exist or make up a portion of a processor, chip, expansion card, or stand-alone device that interfaces with a peripheral device (e.g., vehicle). Example controllers may exist in other formats within other examples as well.

As previously indicated, a system in control of vehicle operations or functions may include a microprocessor functioning as a primary controller. As a primary controller, the controller may execute main controls of the vehicle, which may cause the vehicle to rely on the primary controller to control one or multiple functions of the vehicle unless the system detects that the controller may have failed due to an error (e.g., due to a software bug or power failure). For example, the primary controller may execute functions relating to the vehicle's braking system, vehicle propulsion, steering, object detection, or other functions. In particular, a system may include a primary controller or multiple controllers configured as a component of a computing system's processing unit, which may direct operation of the processor, for example.

Within example vehicles, a system may include a primary controller configured to execute logic or software to perform processes relating to functions of the vehicle. The functions may correspond to navigational operations of the vehicle, such as steering or environment-analysis. For example, the navigational operations may include assessing global positioning of the vehicle using a GPS system. Likewise, the primary controller of a system may execute logic based on input received from vehicle sensors or other functional systems (e.g., a server or other vehicles).

Similarly, the primary controller or controllers of a vehicle or mechanical until may execute logic relating to executing other types of vehicle functions (e.g., self-driving actions), which may include braking, vehicle propulsion (e.g., acceleration), or other functions of the vehicle. In other examples, a primary controller of a vehicle may execute logic within a computing system of the vehicle configured to perform other functions of the vehicle not described herein. Further, the system may include primary controllers configured to operate based on software or using information provided by vehicle sensors. For example, a primary controller may operate based on incoming data provided by a vehicle's LIDAR or RADAR system. The logic may include software, gates, or other types of data arranged to enable the controller to execute the functions.

In another example implementation, a computing system may include one or multiple microprocessors, which may include safety processors such as TMs570s controllers or similar types of controllers configured to control various vehicle operations, such as vehicle propulsion, braking, and/or steering. The example TMs570s controllers may include their own fault verification language. Within examples, microprocessors may serve as primary controllers within the computing system and may execute based on a first set or additional sets of logic. Additionally, other types of controllers (e.g., microprocessors) may be utilized as well.

In some implementations, a primary controller may operate based on sets of logic, which may include instructions for control of operation of a vehicle. For example, the primary controller may execute a first set of logic to operate braking and steering associated with the vehicle. Similarly, the first set of logic may enable the primary controller to perform functions relating to vehicle propulsion or other functions. Other controllers may execute other sets of logic to perform functions.

Additionally, the computing system may include additional primary controllers operating on the first set of logic described above or may operate on other types of logic. The primary controllers may be configured to share functions, actively control the functions simultaneously, or serve as backups in a configuration.

At block 304, the method 300 may also include providing a secondary controller configured in a redundant configuration as the primary controller. In particular, within some implementations, the primary controller and the secondary controller may be configured to perform cross-checks of each other. In some instances, a primary controller and secondary controller within a system may reset based on the system, a component of the system, or the controllers detecting a fault (e.g., operational error) at one of the primary and the secondary controller. For example, the system may transfer control of the vehicle functions over to a secondary controller based on determining that the primary controller is operating improperly due to some fault or error.

In an example implementation, a system of a vehicle may include a pair of two or more controllers positioned in a redundant system. The controllers in the system may control safety critical systems or other functions of the vehicle, such as braking. The redundant configuration of the controllers may include a primary controller and a secondary controller, which may both execute the same software or logic and serve as backups for each other. The system may use the pair of controllers in the redundant system to check for errors from one or both of the controllers. In some instances, the system may also include a monitoring system or component configured to check the operations of the secondary and primary controller set up in the redundant configuration.

Furthermore, the microprocessors of an example system, such as a primary controller and a secondary controller, may execute self-checks, which may involve each controller internally verifying their own correct operation and/or executing a self-reset if any fault is detected. The controllers may be configured to emit a fault signal based on executing an internal self-check. Additionally, a system may include components configured to assist the controllers (e.g., microprocessors) execute internal self-checks.

In some instances, the secondary controller may be positioned within the redundant configuration in addition to other additional controllers positioned in the redundant configuration. As previously indicated, the redundant system of controllers may protect against faults that may shut down part of the system by enabling another controller within the system to take over control.

In an example implementation, a system may include a primary controller and a secondary controller may both be configured to operate based on executing a particular set of logic. The particular set of logic may include software, gates, or other data that enables the controllers to execute various functions of a vehicle or another mechanical unit. Controllers may be configured to switch logic based on input received from the system, for example. That way, controllers may execute updated logic, for example, which may allow the removal of errors within the logic.

Furthermore, example systems may include controllers positioned in other configurations. The configuration of the controllers may allow the controllers to serve as performance-checker for the other controllers. For example, the computing system may include controllers configured in a dual-dual system operating based on the same logic, which may enable outputs of the controllers to be cross-checked by the system to determine any faults by one or the other controller. The dual-dual system may further include multiple controllers, which may be paired within sets for comparisons and analysis purposes. Controllers within a system may be configured in other configurations as well. Further, controllers may execute internal self-checks, which may assist in detecting errors.

At block 306, the method 300 may further include transferring control of operation of the vehicle between the primary controller and the secondary controller based on a detected fault at one of the primary and the secondary controller. The system of the vehicle or another functional entity (e.g., additional controller) may be configured to determine that the primary controller or secondary controller may be operating in an error region, which may require the transfer of control over to the other controller. For example, the system may include a component configured to monitor the operations of the controllers within the system. In instances where the computing system may include additional controllers, the computing system may determine that control of functions of the vehicle should be transferred to another controller other than the primary or secondary controllers. For example, the transition of control may involve providing instructions for the secondary controller to continue operating, start operating, or switch to a control-mode of some type that allows the functions of the secondary controller to direct systems of the vehicle.

In some implementations, an example system may detect a fault at the secondary controller and provide full control of operations previously controlled by the secondary controller to the primary controller. Likewise, the system may provide control of a portion of the functions of the secondary controller to the primary controller after determining that the secondary controller may have failed.

At block 308, the method 300 may include outputting a common fault signal based on detection of a common fault of the primary controller and the secondary controller. A common fault may arise from a common error in logic executed by both controllers or may occur when the controllers positioned within the redundant configuration fail simultaneously. Other situations may exist that may cause both controllers to fail as well.

In some instances, a common fault may occur that causes both the primary controller and the secondary controller to reset within the system. Executing resets may require the system to transfer control of vehicle functions to another component or microprocessor within the system until the resets are complete.

As indicated, an example system may output a common fault signal indicating that the controllers controlling systems and operations of the vehicle may have failed in some manner. Other components within the system may receive the common fault system. In some situations, the system may provide an indication to a driver or another user based on detecting a common fault of controllers assisting in control of vehicle operations. For example, the system may provide a visual and/or audio indication to a driver that errors may have impacted the operation of microprocessors controlling vehicle functions.

In some instances, after possibly transferring control of operations between controllers, an example system may determine that the other controller (e.g., secondary controller) operating in the system may also have failed based on a common fault (e.g., common mode fault and simultaneous error of both controllers). A common fault may arise from the controllers within a system all operating based on the same set of logic. For example, an error in the logic may likely cause all the controls to output inaccurately as a result of the error. In some instances, logic may be derived from another set of logic. In this case, a common fault may still arise between the controllers functioning based on similar logic sets. Other errors may cause controllers to operate inaccurately, such as simultaneous errors caused by a bug or error in logic.

At block 310, the method 300 may include, based on the common fault signal, transferring control of operation of the vehicle to a safety controller that is configured to perform functions associated with control of operation of the vehicle including vehicle braking. In particular, in some example implementations, a microprocessor may act as a safety controller (also referred to failsafe controllers herein) and may be configured to operate separately from the redundant system of primary controllers. For example, the safety controller may operate based on a set of logic (e.g., a second set of logic) that differs from the set of logic that the primary and/or secondary controllers may be operating based on. Operating based on different logic may make the safety controller immune or at least functional despite errors in the logic used by the primary controller and/or secondary controller.

In some example implementations, a system may include at least one safety controller configured to assume control of vehicle operations until another microprocessor may complete resetting in the system and reassume control of the vehicle operations. For example, the system may provide control to the safety controller until one or both of the primary controller and the secondary controller have completed resetting or otherwise recovering from the originally detected failure or other error that caused the safety controller to receive control of the vehicle's functions.

In some instances, an example system of the vehicle, such as a control unit, controlling operations of the vehicle may provide control to a secondary backup or tertiary backup controller configured as a safety controller (e.g., failsafe controller) as a result of detecting a fault in the primary system of controllers. The safety controller may be configured to protect against certain faults, which may include common faults occurring when multiple controllers sharing redundancy and running the same code. For example, a bug in the code may manifest in all codes at the same time causing controllers to operate incorrectly. The safety controller may be configured to operate using a different code or logic from other controllers. By using a different code, the safety controller may be able to avoid the common bugs or other functional problems that may interrupt the operations of the other controllers.

In some instances, a safety controller within the system may determine a state of operation of the vehicle or mechanical unit prior to executing the second set of logic to perform functions. For example, the safety controller may access the functions that should be performed based on the current state of the vehicle. If the vehicle is navigating a path of travel, the safety controller may be configured to assume control and apply a braking function to slow down the vehicle. The safety controller may also perform multiple or all functions associated with controlling the vehicle that may have been controlled by the primary controller and/or the secondary controller.

In an example implementation, a computing system or system in general may include multiple failsafe controllers configured to serve as potential back up controllers in cases of operational errors. The various failsafe controllers may be configured to operate singularly without assistance from other controllers or may communicate with other controllers or components, for example. In some situations, a failsafe controller may operate using different code from other controllers, which may enable the failsafe to take over operation of the system in case of failures by others.

Within some example implementations, a system may include hardware logic that manages switchover from primary controllers with faults to fail safe controller or controllers in the event that all primary controllers fail. In addition, other forms of logic may assist in the handover.

In addition, a system assisting in the operations of a vehicle may include a reset module configured to reset any primary controllers and/or secondary controllers upon detecting a common fault. In some instances, the reset module may further transfer control of operation of the vehicle from the safety controller to a primary controller after executing the reset.

In an example implementation, a vehicle may include multiple controllers operating in dual-dual design architecture approach. In such example architecture, two or more pairs of controllers may be used, which may involve each pair executing a cross-check to determine whether the pair's operation or outcomes disagree. In the case that the outcomes may disagree or the operation of the pair of controllers may not be similar, the pair of controllers may shut themselves off (e.g., fail silent), which leaves the other pair or pairs of controllers operating in control. In the case that both pairs may be determined to be operating based on a common failure (e.g., simultaneous errors) or error in logic, a computing system of the mechanical unit (e.g., vehicle) may provide instructions to an additional microprocessor (e.g., another controller) configured to operate as a safety controller. The safety controller or controllers may be configured to continue operations of the vehicle, which may include braking or other functions. In addition, the safety controller or controllers may be configured to perform functions based on different logic than the pairs of controllers, which may include performing simplified logic configured to execute basic functions of the mechanical unit (e.g., vehicle).

In another example implementation, a vehicle may operate with assistance from controllers operating in a tri-configuration, which may involve multiple controllers checking outputs of other controllers within the tri-configuration.

Further, in one example implementation, a system may include a primary controller configured to perform functions corresponding to the operations of a vehicle. For example, the primary controller may execute functions relating to vehicle propulsion, braking, and steering. The system may also include a secondary controller configured in a redundant configuration as the primary controller. For example, a redundant configuration may arrange the primary controller and the secondary controller in manner that enables the controllers to perform cross-checks of each other and to reset based on a detected fault at one of the primary and the secondary controller. Various types of faults may cause the primary controller or secondary controller to operate incorrectly, such as software bugs. An error, flaw, failure, or fault may exist within the logic executed by the controllers causing the controllers to operate incorrectly or produce unexpected results, for example.

In addition, within implementations, a system may also include a control module configured to transfer control of operation of the vehicle between the primary controller and the secondary controller based on the detected fault at one of the primary and the secondary controller. The control module may be further configured to detect a common fault (e.g., simultaneous error) of the primary controller and the secondary controller that causes both the primary controller and the secondary controller to reset and the control module may be configured to responsively output a common fault signal (e.g., signal or other form of indication). During operation, the system may utilize a safety controller coupled to the control module, and based on receiving the common fault signal the safety controller, the system may transfer of control of operation of the vehicle to the safety controller to perform functions associated with control of operation of the vehicle including vehicle braking.

In yet another example implementation, a system may be configured with a primary controller, secondary controller and a safety controller operating the controls of a vehicle at the same time. Similarly, the different controllers may respectively operate controls of the vehicle at any given time.

In another example implementation, a control module or system may reset a primary controller and secondary controller based on transferring control of operation of the vehicle to a driver. Further, the size and processing power of controllers may vary within different example implementations. For example, a primary controller may include more processing power than a failsafe controller.

FIG. 4A illustrates an example system for compensating for common failures in a fail operational system. The example system 400 shown in the illustration of FIG. 4A may include more or less components within other implementations. The different components may be configured to execute various functions, such as watch dog timers, controllers, vehicle functions, or other possible functions. The functions shown within the components shown in FIG. 4A are for illustration purposes and may vary within other examples.

In addition, the system may include other types of components as well as duplicates (e.g., additional components) of the components presented in the illustration. The connections between components may vary as well and may include electrical or structural connections. Further, the system may include additional electrical or hardware functions, which may include logic. The system may serve as a possible component of a vehicle, such as a computing system controlling functions of the vehicle.

The example system may include multiple controllers, such as the controllers 402 (TMS570) shown in FIG. 4A. Although the example system includes safety microprocessors serving as the controllers 402, other example systems may include other types of processors or microprocessors, for example. As shown, example microprocessors, such as the multiple TMS570 controllers, may be positioned a redundant configuration, which may enable the system to cross check the performance of controllers to identify any possible errors. The microprocessors may be configured to execute the cross-check based on outputs of each other. The different controllers 402 may check each other for errors, for example.

Although the example controllers 402 may exist as TMS570 types in the illustration shown in FIG. 4A, other example systems may include other types of controllers (e.g., microprocessors). Furthermore, the processing power of the controllers may vary within examples. In some instances, example systems that may control operations of a vehicle or another type of machine may include additional controllers, which may be positioned in other configurations. Likewise, a system may also include a single primary controller configured to handle operations of the vehicle without other controllers positioned in a redundant configuration.

In addition, the example system also includes other components, such as a safety controller 404 configured to receive control of operations based on detecting a common operation fault of the controllers 402 or another type of fault/error. The safety controller 404 may receive control of one or more functions of the vehicle based on the failover logic 406 or another component of the example system 400 detecting the controllers 402 both operating inaccurately. As previously indicated, the safety controller 404 may be configured to execute logic other than the logic executed by the controllers 402, which may allow the safety controller 404 to control functions of the vehicle without being susceptible to the software bugs or errors of the controllers 402.

The failover logic 406 shown in the example system 400 may monitor the activity and/or outputs of the controllers 402 as well as the safety controller 404. Furthermore, the failover logic 406 may monitor and control transferring control between controllers using different types of logic. For example, the failover logic 406 may be configured as the example failover logic system 500 shown in FIG. 5.

The example system 400 may also include one or multiple watchdog 408 components. An example watchdog 408 component (also known as a computer operating properly or COP timer) may exist as an electronic timer that may be used to detect and recover from computer malfunctions. For example, during normal operation, the system 400 may regularly restart the watchdog 408 components to prevent them from elapsing or "timing out". If, due to a hardware fault or software/program error (e.g., common fault), the system may fail to restart the watchdog 408 component or components, the watchdog 408 component(s) may elapse and generate a timeout signal. The timeout signal may be used to initiate corrective action or actions, such as indicating that the failover logic 406 should provide control of vehicle functions over to the safety controller 404. For example, the watchdog 408 component may determine that the TMS570 controller 402 may be incurred a fault, which may require the system 400 providing control to the safety controller 404 until the TMS570 controllers 402 reset and resume normal operation.

Furthermore, the example system 400 may include additional components, such as relays/FETs 510 shown in the conceptual illustration of FIG. 4A. The example system 400 may include other components as well. Likewise, the example system 400 of FIG. 4A may include blocks 412 illustrating possible functions of a vehicle that controllers may execute. FIG. 4A shows multiple blocks 412 representing functions, which may involve operations of the vehicle, such as steering, vehicle propulsion, braking, environment-analysis, or other possible vehicle operations. The different controllers within the example system 400 may execute logic that performs the various functions of the vehicle. The different connections show that different controllers may have control of functions at various times based on the configuration of the system 400. Other example configurations or systems may exist as well.

Figure 4B:
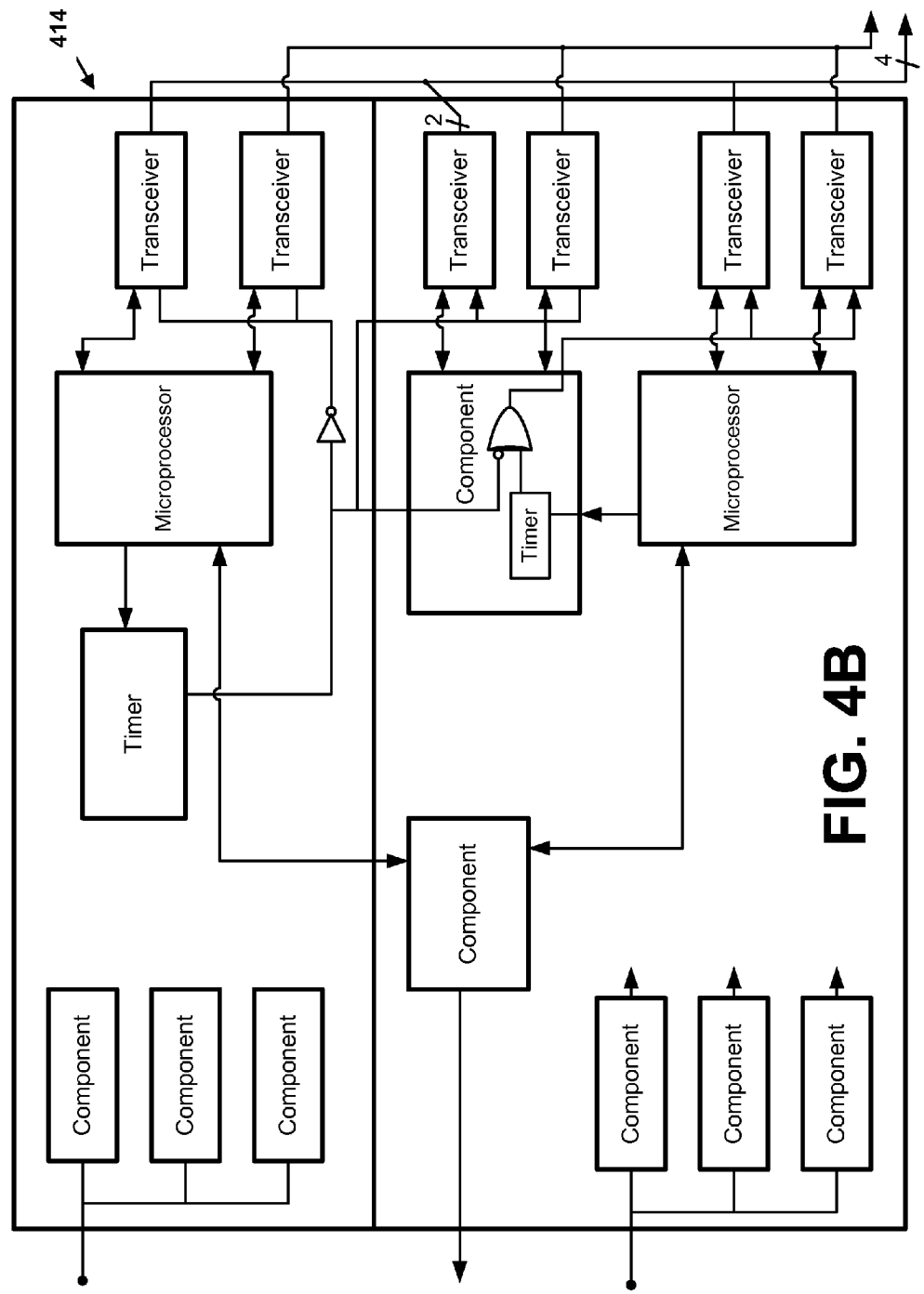
FIG. 4B illustrates another example system for compensating for common failures in a fail operational system.

FIG. 4B illustrates another example system for compensating for common failures in a fail operational system. The example system 414 includes a variety of components arranged in a manner that may be utilized by a vehicle to determine control of vehicle functions. In particular, the example system includes microprocessors arranged in a redundant configuration, which may allow the microprocessors or the system to perform cross-checks of the outputs of the microprocessors. This may enable the system 414 to determine any possible failures that may require the system or a control module within the system to transfer control of one or multiple vehicle functions to another microprocessor, such as a microprocessor serving as a safety controller.

The various components shown within the example system 414 may exist as various types of components, such as additional microprocessors, logic gates, functions, timers, transceivers, receivers, and/or other possible components. The connections may vary within other example systems and may include electrical and/or mechanical connections, such as buses or other communication links. Further, the components may include logic, processors, or other elements.

The example system 414 may include a safety controller configured to control vehicle functions when the primarily controlling microprocessors are experiencing some sort of failure (e.g., a bug in software) or may require a reset or shut down prior to assuming control of vehicle functions. The safety controller may control one or particular vehicle functions, such as vehicle braking, or may be configured to control multiple vehicle functions to resume normal driving.

Within other examples, the system 414 may include additional or less components, which may be arranged in other formats and connections. The system 414 may include additional safety controllers or other microprocessors configured to assist in vehicle operations in cases that microprocessors in a redundant configuration fail or require some reset period.

Figure 5:
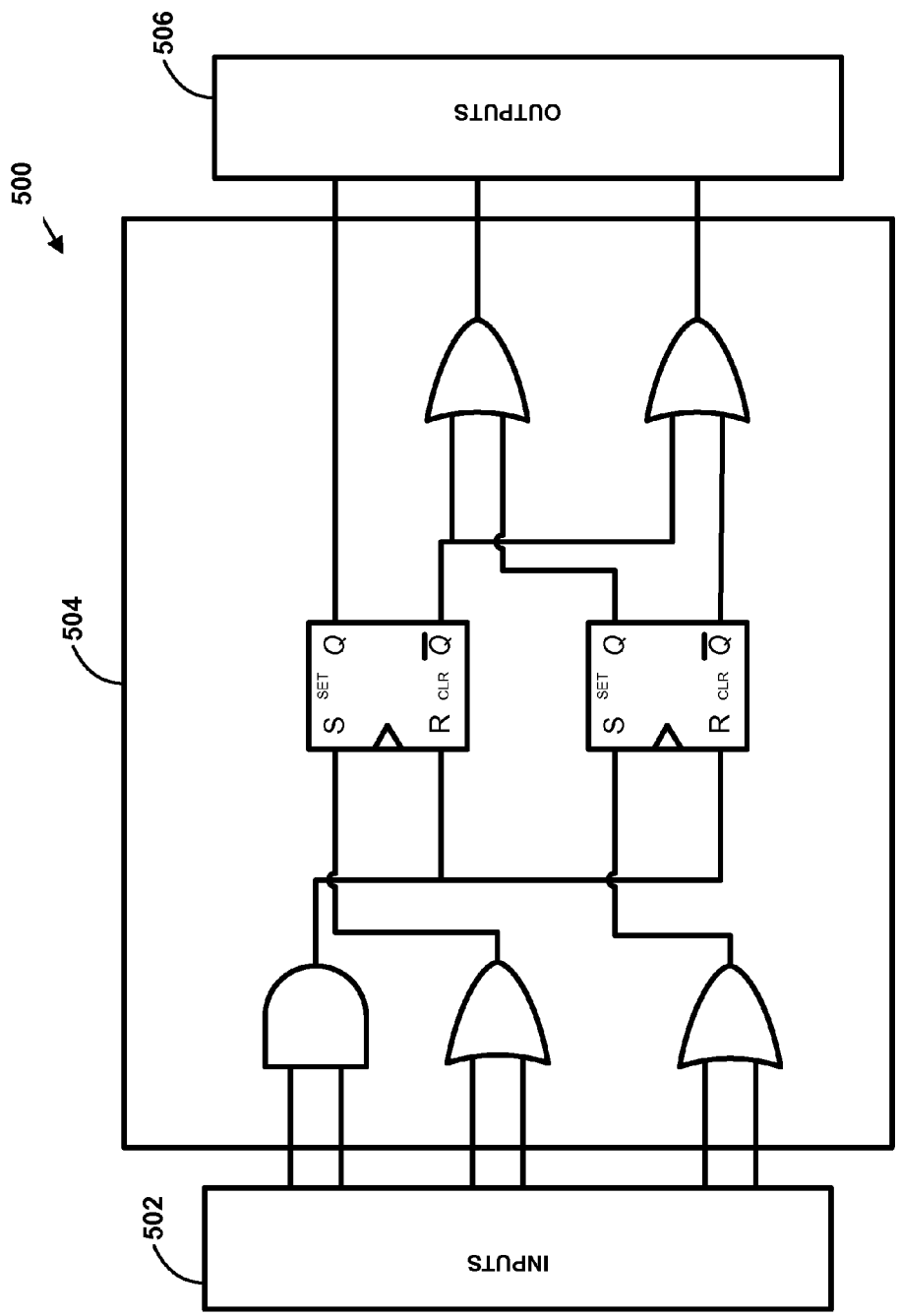
FIG. 5 shows a conceptual illustration of an example system for failover logic.

FIG. 5 shows a conceptual illustration of an example system 500 for failover logic. In particular, the conceptual illustration shows a box representing inputs 502 that may be received by the system 500 and entered into the failover logic shown in box 504. The failover logic of the example system 500 shown in box 504 may process the inputs 502 in order to determine the outputs 506 represented by the outputs box shown in the conceptual illustration of FIG. 5.

Within the example system for failover logic shown in FIG. 5, different types of logic gates are connected in a manner that may enable a system to determine if providing a handoff to a safety controller or another option may be necessary or useful based on operation of the multiple controllers involved. The system may utilize inputs 502 as shown in the conceptual illustration and may process the inputs 502 using the different types of logic shown in box 504. The logic shown in box 504 illustrates one possible example of many possible implementations that may be used to monitor and determine when handoffs between controllers should be initiated. Other example implementations may exist in other examples of failover logic, which may involve more or less gates as well as different types of gates. The example system shown in FIG. 5 serves as one illustration.

In the example system, the failover logic in the box 504 includes AND gates and OR gates communicating through different connections. In other examples, the failover logic of box 504 may include other types of gates, which may also lead to different connections. The logic gates connected within the example system 500 of failover logic may be configured to execute a variety of checks based on the operation of one or multiple controllers assisting in operations of the vehicle. For example, the logic of example system 500 generated through the variety of gates may monitor and determine any possible failures that may occur between a primary controller and a secondary controller or other types of controllers. The logic system may provide indications within the outputs 506 provided by the logic of the example box 504. In such an example, the failover logic may enable the system to determine that a primary controller may not be operating properly and cause the system to hand over control of a function or multiple functions to the secondary controller. In addition, the failover logic of box 504 in the example system 500 shown in FIG. 5 may provide an indication or signal in the outputs 506 to the secondary controller that a primary controller has failed, for example.

Similarly, the failover logic example system 500 may also be configured to provide a signal to a safety controller indicating that a secondary and/or primary controller may have failed. The logic within the system 500 may indicate which controller may control a function or multiple functions of the vehicle.

In addition, the failover logic may further indicate through logic means for the safety controller to return operating control of one or more systems of a vehicle to a secondary controller and/or primary controller. In such an example, the system 500 may provide outputs 506 signaling a reset from a safe-fail controller to a primary controller.

Furthermore, the failover logic of the example system 500 may also provide logic to indicate a force fail from a primary controller to a secondary controller, which may exist differently from a potential failure detected. The force fail hand off from a primary controller to a secondary controller may exist based on an error in logic execution by the primary controller. The failover logic may also include logic to allow multiple controllers to be unmated, for example.

Figure 6:
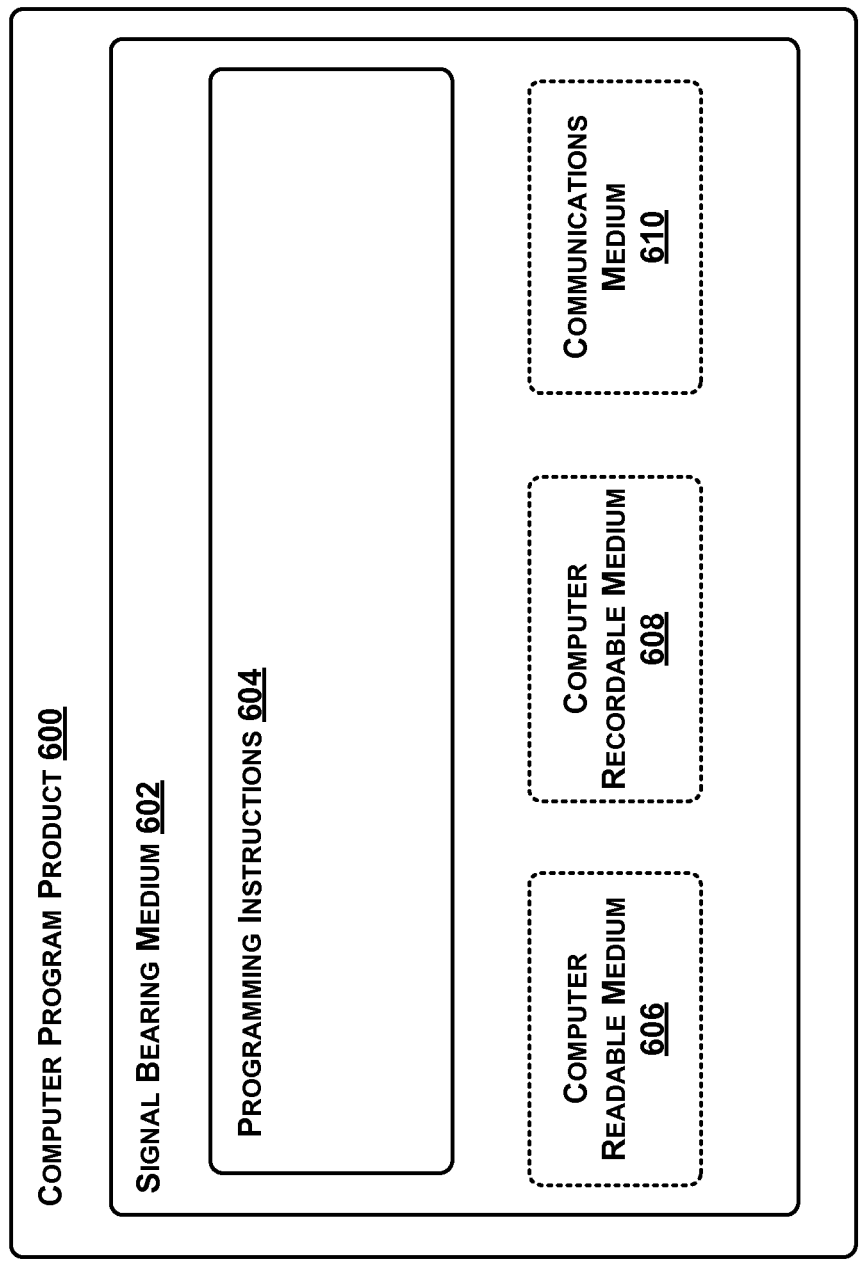
FIG. 6 is a schematic illustrating a conceptual partial view of an example computer program product that includes a computer program for executing a computer process on a computing device.

FIG. 6 is a schematic illustrating a conceptual partial view of an example computer program product that includes a computer program for executing a computer process on a computing device, arranged according to at least some embodiments presented herein.

In one embodiment, the example computer program product 600 is provided using a signal bearing medium 602. The signal bearing medium 602 may include one or more programming instructions 604 that, when executed by one or more processors may provide functionality or portions of the functionality described above with respect to FIGS. 1-3 and FIGS. 4A-4D. In some examples, the signal bearing medium 602 may encompass a computer-readable medium 606, such as, but not limited to, a hard disk drive, a Compact Disc (CD), a Digital Video Disk (DVD), a digital tape, memory, etc. In some implementations, the signal bearing medium 602 may encompass a computer recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, the signal bearing medium 602 may be conveyed by a wireless form of the communications medium 610.

The one or more programming instructions 604 may be, for example, computer executable and/or logic implemented instructions. In some examples, a computing device such as the processor 112 of FIG. 1 may be configured to provide various operations, functions, or actions in response to the programming instructions 604 conveyed to the processor by one or more of the computer readable medium 606, the computer recordable medium 608, and/or the communications medium 610.

The non-transitory computer readable medium could also be distributed among multiple data storage elements, which could be remotely located from each other. The computing device that executes some or all of the stored instructions could be a device, such as the device 100 illustrated in FIG. 1. Alternatively, the computing device that executes some or all of the stored instructions could be another computing device, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

The invention claimed is:

1. A system comprising:
   a primary controller configured to perform functions associated with control of operation of a vehicle including vehicle propulsion, braking and steering;
   a secondary controller configured in a redundant configuration as the primary controller, wherein the primary controller and the secondary controller are configured to operate based on execution of a first set of logic and perform cross-checks of each other;
   a control module configured to transfer control of operation of the vehicle between the primary controller and the secondary controller based on a detected fault at one of the primary controller and the secondary controller, wherein the control module is further configured to detect a common fault of the primary controller and the secondary controller and the control module is configured to responsively output a common fault signal;
   a safety controller coupled to the control module configured to operate based on execution of a second set of logic independent of operation of the primary controller and the secondary controller, and based on receiving the common fault signal the safety controller is configured to receive transfer of control of operation of the vehicle; and to perform functions associated with control of operation of the vehicle including vehicle braking.

2. The system of claim 1, wherein the common fault is based on an error in execution of the first set of logic.

3. The system of claim 1, wherein the first set of logic includes instructions for control of operation of the vehicle including vehicle propulsion, braking and steering, and the second set of logic includes instructions for control of operation of the vehicle including vehicle braking.

4. The system of claim 1, wherein the safety controller is further configured to:
   determine a state of operation of the vehicle; and
   based on the state of operation, perform functions associated with control of operation of the vehicle including vehicle braking.

5. The system of claim 1, wherein the safety controller is further configured to:
   determine a state of operation of the vehicle; and
   based on the state of operation, perform all functions associated with control of operation of the vehicle as were performed by the primary controller and the secondary controller.

6. The system of claim 1, further comprising a reset module configured to:
   reset the primary controller and the secondary controller based on detection of the common fault; and
   transfer control of operation of the vehicle from the safety controller to the primary controller after reset.

7. The system of claim 1, wherein only one of the primary controller, the secondary controller, and the safety controller are set to be in control of operation of the vehicle at any given time.

8. The system of claim 1, wherein the control module is further configured to:
   provide a notification indicating the detected common fault; and
   based on receiving an input signal, transfer control of operation of the vehicle to a human driver.

9. The system of claim 8, wherein the control module is configured to reset the primary controller and the secondary controller based on transfer of control of operation of the vehicle to the human driver.

10. The system of claim 1, wherein the vehicle is configured to operate in an autonomous manner.

11. A method comprising:
   providing instructions, by a primary controller, to perform functions associated with control of operation of a vehicle including vehicle propulsion, braking and steering;
   providing a secondary controller configured in a redundant configuration as the primary controller, wherein the primary controller and the secondary controller are configured to operate based on execution of a first set of logic and perform cross-checks of each other and to reset based on a detected fault at one of the primary controller and the secondary controller;

transferring control of operation of the vehicle between the primary controller and the secondary controller based on the detected fault at one of the primary controller and the secondary controller;

outputting a common fault signal based on detection of a common fault of the primary controller and the secondary controller;

based on the common fault signal, transferring control of operation of the vehicle by the primary controller to a safety controller that is configured to operate based on execution of a second set of logic independent of operation of the primary controller and the secondary controller; and performing functions associated with control of operation of the vehicle at the safety controller including vehicle braking.

12. The method of claim 11, wherein transferring control of operation of the vehicle to a safety controller that is configured to perform functions associated with control of operation of the vehicle including vehicle braking comprises:

transferring control of operation of the vehicle to a plurality of safety controllers, wherein a given safety controller of the plurality of safety controllers is configured to perform a respective function associated with control of operation of the vehicle.

13. The method of claim 11, further comprising:
determining a state of operation of the vehicle; and
based on the state of operation, performing all functions associated with control of operation of the vehicle as were performed by the primary controller and the secondary controller.

14. The method of claim 11, wherein the common fault of the primary controller and the secondary controller causes the primary controller and the secondary controller to reset.

15. The method of claim 11, further comprising:
resetting the primary controller and the secondary controller based on detection of the common fault; and
transferring control of operation of the vehicle from the safety controller to the primary controller after reset.

16. A non-transitory computer readable medium having stored therein instructions, that when executed by a computing device, cause the computing device to perform functions comprising:

receiving outputs of a primary controller and a secondary controller, wherein the primary controller is configured to perform functions associated with control of operation of a vehicle including vehicle propulsion, braking and steering, and the secondary controller is configured in a redundant configuration as the primary controller, wherein the primary controller and the secondary controller are configured to operate based on execution of a first set of logic and perform cross-checks of each other;

providing instructions to transfer control of operation of the vehicle between the primary controller and the secondary controller based on receiving a given output indicative of a detected fault at one of the primary controller and the secondary controller;

providing instructions to transfer control of operation of the vehicle from the primary controller to a safety controller based on detection of a common fault of the primary controller and the secondary controller, wherein the safety controller is configured to operate based on execution of a second set of logic independent of operation of the primary controller and the secondary controller; and performing functions associated with control of operation of the vehicle at the safety controller including vehicle braking.

17. The non-transitory computer readable medium of claim 16, wherein the primary controller and the secondary controller are further configured to perform internal self-checks to determine whether one or both of the primary controller and the secondary controller provide outputs indicative of a detected fault.

18. The non-transitory computer readable medium of claim 16, wherein the instructions to transfer control of operation of the vehicle to a safety controller based on detection of a common fault of the primary controller and the secondary controller comprise:

instructions to transfer control of operation of the vehicle to a plurality of safety controllers configured to operate in a redundant configuration.

\* \* \* \* \*